United States Patent
Richbourg et al.

(10) Patent No.: US 11,030,494 B1
(45) Date of Patent: Jun. 8, 2021

(54) SYSTEMS AND METHODS FOR MANAGING DATA SPILLS

(71) Applicant: Palantir Technologies Inc., Palo Alto, CA (US)

(72) Inventors: Christopher Richbourg, Arlington, VA (US); Alexander Mark, New York, NY (US); Daniel Sperling, Palo Alto, CA (US); James Schweiger, Baltimore, MD (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 181 days.

(21) Appl. No.: 15/653,307

(22) Filed: Jul. 18, 2017

Related U.S. Application Data (60) Provisional application No. 62/520,389, filed on Jun. 15, 2017.

(51) Int. Cl.
| | |
|---|---|
| *G06K 9/00* | (2006.01) |
| *G06K 9/72* | (2006.01) |
| *G06F 40/211* | (2020.01) |
| *G06F 16/903* | (2019.01) |

(52) U.S. Cl.
CPC .............. *G06K 9/72* (2013.01); *G06F 40/211* (2020.01); *G06F 16/90344* (2019.01)

(58) Field of Classification Search
CPC .... G06K 9/72; G06F 40/211; G06F 16/90344
USPC ....................................................... 382/229
See application file for complete search history.

(56) References Cited

U.S. PATENT DOCUMENTS

| | | |
|---|---|---|
| 5,548,749 A | 8/1996 | Kroenke et al. |
| 5,708,828 A | 1/1998 | Coleman |
| 5,765,171 A | 6/1998 | Gehani et al. |
| 5,870,761 A | 2/1999 | Demers et al. |
| 6,098,078 A | 8/2000 | Gehani et al. |
| 6,190,053 B1 | 2/2001 | Stahlecker et al. |
| 6,202,085 B1 | 3/2001 | Benson et al. |

(Continued)

FOREIGN PATENT DOCUMENTS

| | | |
|---|---|---|
| AU | 2011279270 | 9/2015 |
| EP | 0 816 968 | 1/1996 |

(Continued)

OTHER PUBLICATIONS

NIMA (National Imagery and Mapping Agency, "Guide to Marking Documents," Oct. 4, 2001, https://fas.org/sgp/othergov/dod/nimaguide.pdf (Year: 2001).*

(Continued)

*Primary Examiner* — Andrew M Moyer
(74) *Attorney, Agent, or Firm* — Sheppard Mullin Richter & Hampton LLP (57) ABSTRACT

Systems, methods, and non-transitory computer readable media are provided for managing data spills. A classified document may be identified. The classified document may be associated with a document classification marking and one or more portion classification markings. Whether the classified document is misclassified may be determined based on a mismatch between the document classification marking and at least one of the one or more portion classification markings. Responsive to determining that the classified document is misclassified, one or more operations may be performed on the classified document.

20 Claims, 5 Drawing Sheets

(56) References Cited

U.S. PATENT DOCUMENTS

| | | | |
|---|---|---|---|
| 6,216,140 B1 | 4/2001 | Kramer | |
| 6,240,414 B1 | 5/2001 | Beizer et al. | |
| 6,317,754 B1 | 11/2001 | Peng | |
| 6,374,252 B1 | 4/2002 | Althoff et al. | |
| 6,539,381 B1 | 3/2003 | Prasad et al. | |
| 6,560,620 B1 | 5/2003 | Ching | |
| 6,816,941 B1 | 11/2004 | Carlson et al. | |
| 7,072,911 B1 | 7/2006 | Doman | |
| 7,167,877 B2 | 1/2007 | Balogh et al. | |
| 7,437,664 B2 | 10/2008 | Borson | |
| 7,596,285 B2 | 9/2009 | Brown et al. | |
| 7,676,788 B1 | 3/2010 | Ousterhout et al. | |
| 7,730,396 B2 | 6/2010 | Chidlovskii et al. | |
| 7,818,297 B2 | 10/2010 | Peleg et al. | |
| 7,877,421 B2 | 1/2011 | Berger et al. | |
| 7,962,495 B2 | 6/2011 | Jain et al. | |
| 8,015,151 B2 | 9/2011 | Lier et al. | |
| 8,290,990 B2 | 10/2012 | Drath et al. | |
| 8,301,904 B1 | 10/2012 | Gryaznov | |
| 8,312,546 B2 | 11/2012 | Alme | |
| 8,316,060 B1 | 11/2012 | Snyder et al. | |
| 8,380,659 B2 | 2/2013 | Zunger | |
| 8,442,940 B1 | 5/2013 | Faletti et al. | |
| 8,515,912 B2 | 8/2013 | Garrod et al. | |
| 8,527,461 B2 | 9/2013 | Ducott, III et al. | |
| 8,646,080 B2 | 2/2014 | Williamson et al. | |
| 8,688,749 B1 | 4/2014 | Ducott, III et al. | |
| 8,726,379 B1 | 5/2014 | Stiansen et al. | |
| 8,782,004 B2 | 7/2014 | Ducott, III et al. | |
| 8,838,538 B1 | 9/2014 | Landau et al. | |
| 9,009,827 B1 | 4/2015 | Albertson et al. | |
| 9,275,069 B1 | 3/2016 | Garrod et al. | |
| 2003/0084017 A1 | 5/2003 | Ordille | |
| 2003/0088654 A1 | 5/2003 | Good et al. | |
| 2003/0182313 A1 | 9/2003 | Federwisch et al. | |
| 2004/0103124 A1 | 5/2004 | Kupkova | |
| 2004/0111390 A1 | 6/2004 | Saito et al. | |
| 2004/0250576 A1 | 12/2004 | Flanders | |
| 2005/0034107 A1 | 2/2005 | Kendall et al. | |
| 2005/0108063 A1 | 5/2005 | Madill et al. | |
| 2005/0193024 A1 | 9/2005 | Beyer et al. | |
| 2006/0036568 A1 | 2/2006 | Moore et al. | |
| 2006/0106879 A1 | 5/2006 | Zondervan et al. | |
| 2006/0155945 A1 | 7/2006 | McGarvey | |
| 2006/0190497 A1 | 8/2006 | Inturi et al. | |
| 2006/0206866 A1 | 9/2006 | Eldrige et al. | |
| 2006/0218637 A1 | 9/2006 | Thomas et al. | |
| 2006/0224579 A1 | 10/2006 | Zheng | |
| 2007/0005707 A1 | 1/2007 | Teodosiu et al. | |
| 2007/0026373 A1 | 2/2007 | Suriyanarayanan et al. | |
| 2007/0112887 A1 | 5/2007 | Liu et al. | |
| 2007/0168516 A1 | 7/2007 | Liu et al. | |
| 2007/0180075 A1 | 8/2007 | Chasman et al. | |
| 2007/0220067 A1 | 9/2007 | Suriyanarayanan et al. | |
| 2007/0220328 A1 | 9/2007 | Liu et al. | |
| 2007/0233756 A1 | 10/2007 | D'Souza et al. | |
| 2007/0299887 A1 | 12/2007 | Novik et al. | |
| 2008/0027981 A1 | 1/2008 | Wahl | |
| 2008/0033753 A1 | 2/2008 | Canda et al. | |
| 2008/0086718 A1 | 4/2008 | Bostick et al. | |
| 2008/0141117 A1 | 6/2008 | King et al. | |
| 2008/0148398 A1 | 6/2008 | Mezack et al. | |
| 2008/0189240 A1 | 8/2008 | Mullins et al. | |
| 2008/0235575 A1 | 9/2008 | Weiss | |
| 2008/0243951 A1 | 10/2008 | Webman et al. | |
| 2008/0320299 A1 | 12/2008 | Wobber et al. | |
| 2009/0172821 A1 | 7/2009 | Daira et al. | |
| 2009/0199090 A1 | 8/2009 | Poston et al. | |
| 2009/0254970 A1 | 10/2009 | Agarwal et al. | |
| 2010/0100963 A1 | 4/2010 | Mahaffey | |
| 2010/0145909 A1 | 6/2010 | Ngo | |
| 2010/0330801 A1 | 12/2010 | Rouh | |
| 2011/0010342 A1 | 1/2011 | Chen et al. | |
| 2011/0047156 A1* | 2/2011 | Knight | G06F 16/40 707/737 |
| 2011/0219450 A1 | 9/2011 | McDougal et al. | |
| 2011/0246229 A1 | 10/2011 | Pacha | |
| 2012/0005159 A1 | 1/2012 | Wang et al. | |
| 2012/0016849 A1 | 1/2012 | Garrod et al. | |
| 2012/0023075 A1* | 1/2012 | Pulfer | G06F 40/169 707/694 |
| 2012/0036106 A1 | 2/2012 | Desai et al. | |
| 2012/0254129 A1 | 10/2012 | Wheeler et al. | |
| 2013/0006655 A1 | 1/2013 | Van Arkel et al. | |
| 2013/0006668 A1 | 1/2013 | Van Arkel et al. | |
| 2013/0067017 A1 | 3/2013 | Carriere et al. | |
| 2013/0173540 A1 | 7/2013 | Qian et al. | |
| 2013/0191336 A1 | 7/2013 | Ducott et al. | |
| 2013/0191338 A1 | 7/2013 | Ducott, III et al. | |
| 2013/0276799 A1 | 10/2013 | Davidson | |
| 2013/0346444 A1 | 12/2013 | Makkar et al. | |
| 2014/0011000 A1 | 1/2014 | Chakra et al. | |
| 2014/0040182 A1 | 2/2014 | Gilder et al. | |
| 2014/0040714 A1 | 2/2014 | Siegel et al. | |
| 2014/0081652 A1 | 3/2014 | Klindworth | |
| 2014/0114972 A1 | 4/2014 | Ducott et al. | |
| 2014/0129518 A1 | 5/2014 | Ducott et al. | |
| 2014/0149130 A1 | 5/2014 | Getchius | |
| 2015/0074050 A1 | 3/2015 | Landau et al. | |
| 2015/0235334 A1 | 8/2015 | Wang et al. | |
| 2015/0261847 A1 | 9/2015 | Ducott et al. | |
| 2016/0019252 A1 | 1/2016 | Ducott et al. | |
| 2016/0210468 A1* | 7/2016 | Turner | G06F 21/6218 |
| 2016/0350293 A1* | 12/2016 | Gates | G06F 17/30011 |

FOREIGN PATENT DOCUMENTS

| | | |
|---|---|---|
| EP | 1647908 | 4/2006 |
| EP | 2911078 | 8/2015 |
| NL | 2011642 | 8/2015 |
| WO | WO 2008/113059 | 9/2008 |
| WO | WO 2011/161565 | 12/2011 |
| WO | WO 2012/009397 | 1/2012 |

OTHER PUBLICATIONS

Dell Latitude D600 2003, Dell Inc., http://www.dell.com/downloads/global/products/latit/en/spec_latit_d600_en.pdf.

Dou et al., "Ontology Translaation on the Semantic Web 2005," Springer-Verlag, Journal on Data Semantics II Lecture Notes in Computer Science, vol. 3350, pp. 35-37.

Fidge, Colin J., "Timestamps in Message-Passing Systems," K. Raymond (Ed.) Proc. of the 11th Australian Computer Science Conference (ACSC 1988), pp. 56-66.

Holliday, JoAnne, "Replicated Database Recovery using Multicast Communication," IEEE 2002, pp. 11.

Lam Port, "Time, Clocks and the Ordering of Events in a Distributed System," Communications of the ACM, Jul. 1978, vol. 21, No. 7, pp. 558-565.

Loeliger, Jon, "Version Control with Git," O'Reilly, May 2009, pp. 330. In 2 parts.

Mattern, F., "Virtual Time and Global States of Distributed Systems," Cosnard, M., Proc. Workshop on Parallel and Distributed Algorithms, Chateau de Bonas, France:Elsevier, 1989, pp. 215-226.

Notice of Allowance for U.S. Appl. No. 13/657,684 dated Mar. 2, 2015.

Notice of Allowance for U.S. Appl. No. 14/156,208 dated Feb. 12, 2016.

Notice of Allowance for U.S. Appl. No. 14/286,485 dated Jul. 29, 2015.

Notice of Allowance for U.S. Appl. No. 14/334,232 dated Nov. 10, 2015.

Notice of Allowance for U.S. Appl. No. 14/473,860 dated Jan. 5, 2015.

Official Communication for European Patent Application No. 14159175.0 dated Feb. 4, 2016.

Official Communication for European Patent Application No. 15155845.9 dated Oct. 6, 2015.

Official Communication for U.S. Appl. No. 13/657,684 dated Aug. 28, 2014.

(56) References Cited

OTHER PUBLICATIONS

Official Communication for U.S. Appl. No. 14/076,385 dated Jan. 22, 2015.
Official Communication for U.S. Appl. No. 14/076,385 dated Jun. 2, 2015.
Official Communication for U.S. Appl. No. 14/076,385 dated Jan. 25, 2016.
Official Communication for U.S. Appl. No. 14/156,208 dated Mar. 9, 2015.
Official Communication for U.S. Appl. No. 14/156,208 dated Aug. 11, 2015.
Official Communication for U.S. Appl. No. 14/156,208 dated Sep. 17, 2015.
Official Communication for U.S. Appl. No. 14/286,485 dated Mar. 12, 2015.
Official Communication for U.S. Appl. No. 14/286,485 dated Apr. 30, 2015.
Official Communication for U.S. Appl. No. 14/334,232 dated Jul. 10, 2015.
Official Communication for U.S. Appl. No. 14/518,757 dated Apr. 2, 2015.
Official Communication for U.S. Appl. No. 14/518,757 dated Jul. 20, 2015.
Official Communication for U.S. Appl. No. 14/518,757 dated Dec. 1, 2015.
O'Sullivan, Bryan, "Making Sense of Revision Control Systems," Communications of the ACM, Sep. 2009, vol. 52, No. 9, pp. 57-62.
OWL Web Ontology Language Reference Feb. 4, W3C, http://www.w3.org/TR/owl-ref/.
Parker, Jr. et al., "Detection of Mutual Inconsistency in Distributed Systems," IEEE Transactions in Software Engineering, May 1983, vol. SE-9, No. 3, pp. 241-247.
Symantec Corporation, "E-Security Begins with Sound Security Policies," Announcement Symantec, Jun. 14, 2001.

\* cited by examiner

SYSTEMS AND METHODS FOR MANAGING DATA SPILLS

CROSS REFERENCE TO RELATED APPLICATIONS

This application claims the benefit under 35 U.S.C. § 119(e) of the U.S. Provisional Application Ser. No. 62/520,389, filed Jun. 15, 2017, the content of which is hereby incorporated by reference in its entirety.

FIELD OF THE INVENTION

This disclosure relates to approaches for managing data spills.

BACKGROUND

Under conventional approaches, data entered into a system may be misclassified. Misclassification of data may propagate to various data sources. Misclassification of data may result in misuse (e.g., unauthorized access, data spill) of the misclassified data and/or further misclassification of other data. Correcting misclassification of the data and propagation of the misclassified data may be difficult and time consuming.

SUMMARY

Various embodiments of the present disclosure may include systems, methods, and non-transitory computer readable media configured to identify a classified document. The classified document may be associated with a document classification marking and one or more portion classification markings. Whether the classified document is misclassified may be determined based on a mismatch between the document classification marking and one or more portion classification markings. Responsive to a determination that the classified document is misclassified, one or more operations may be performed on the classified document.

In some embodiments, one or both of the document classification marking and the portion classification marking(s) may be embedded in a header of the classified document.

In some embodiments, the classified document may be determined to be misclassified based on a mismatch between a user classification level and one or both of the document classification marking and the portion classification marking(s).

In some embodiments, identifying the classified document may include monitoring an object event stream to detect an upload of the classified document. The object event stream may enable central tracking of changes in a network.

In some embodiments, the operation(s) may include flagging the classified document as including mismatched classifications and providing an interface through which a user may review the mismatched classifications. The interface may enable the user to release, delete, or reclassify the classified document.

In some embodiments, the operation(s) may include quarantining the classified document. The quarantined classified document may be prevented from being propagated to other data sources.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

A claimed solution rooted in computer technology overcomes problems specifically arising in the realm of computer technology. In various implementations, a computing system may identify a classified document. The classified document may be identified by monitoring an object event stream. The object event stream may enable central tracking of changes in a network. The classified document may be associated with a document classification marking and one or more portion classification markings. The document classification marking may refer to an overall level of classification assigned to the document. The portion classification markings may identify respective classification levels for various portions of the document. The computing system may determine that the classified document is misclassified based on a mismatch between the document classification marking and one or more portion classification markings. Depending on the implementation, the computing system may, responsive to determining that the classified document is misclassified, quarantine the classified document, flag the classified document as including mismatched classifications, and/or provide an interface through which a user may review the mismatched classifications. The interface may enable the user to release, delete, or reclassify the classified document.

The approach disclosed herein provides a tool for preventing data spills. A data spill may refer to provision of sensitive/restricted information to unauthorized systems/users. Data spills may result from misclassification of data. Misclassification of data may propagate from a single data source (e.g., database, electronic storage, computing device) to other data sources. For example, data ingested into a given data node of a network of data nodes may be misclassified. In this example, the ingested data may propagate through the network, resulting in misuse of the data, misclassification of other data, and/or misuse of other data. Correcting such data spills (e.g., misclassification of the data and propagation of the misclassified data) may be difficult and time consuming. For example, correcting a data spill may require shutting down affected portions of the network, identifying and correcting/removing misclassified data, and identifying and correcting/removing other data affected by the data spill. The approach disclosed herein provides an automated tool to prevent data spills by preventing the propagation of misclassified data.

In general, a document may refer to a collection of information. For example, a document may refer to a collection of visual information (e.g., text, image, video), audio information (e.g., sound recording, music), and/or other information. A document may be represented as one or more electronic files. Information within a document may be organized in sections or as a stream of information. For example, information within a document may be separated into different sections (e.g., paragraphs, cells, pages, slides) or may be organized without any specific separation of different portions of the information (e.g., an electronic file without page breaks).

A classified document may refer to a document associated with one or more classification markings. Classification markings may categorize information within a document. For example, classification markings may categorize information within a document into different security/sensitivity classifications. Other types of classifications are contemplated.

A classified document may be associated with a document classification marking and one or more portion classification markings. In some embodiments, a document classification marking may be used to classify the entirety of a classified document. In some embodiments, a document classification marking may refer to an overall level of classification assigned to a document. In some embodiments, a portion classification marking may be used to classify a portion of a classified document. Similarly, portion classification markings may identify respective classification levels for various portions of a document. For example, a classified document may be associated with a document classification marking and three portion classification markings. The document classification marking may classify information within the classified document as a whole while individual portion classification markings may classify information within their corresponding portions of the classified document.

The document classification marking and the portion classification marking(s) may be created manually or automatically. For example, a user may mark a particular document with a particular document classification marking and/or particular portion classification markings. As another example, a computing system may mark a particular document with a particular document classification marking and/or particular portion classification markings. In some embodiments, the computing system may automatically mark the particular document based on user information. For example, user information may identify classification(s) that have been authorized (or approved) for a particular user. For example, a particular user may be allowed to mark a document/portions of a document with a particular classification. In some embodiments, the computing system may automatically mark a particular document based on analysis of the information contained within the document. For example, the computing system may identify words/semantics within the document and associate portions of the document or all of the document with particular classifications based on one or more classification guides. In some embodiments, a classification guide may define rules for identifying classification of portions/entirety of a document. The computing system may mark a particular document based on a source of the information contained within the particular document.

Classification markings may be stored within a classified document. For example, document and/or portion classification marking information (e.g., text, image, watermark, metadata) may be stored within a classified document. In some embodiments, document and/or portion classification markings may be embedded in a header (e.g., within classification fields located outside of the main document content) of a classified document. In some embodiments, classification markings may be stored separately from a classified document. For example, document and/or portion classification markings may be stored within a file separate from the document. Other storage locations of classification markings within/separately from a classified document are contemplated. In some embodiments, the locations of classification markings may indicate the type of the classification markings and/or the portion of the document to which the classification markings correspond. For example, a classification marking placed at the top/front/background of a classified document may indicate that the classification marking is a document classification marking applicable to the entirety of the classified document. A classification marking placed within the body of a classified document may indicate that the classification marking is a portion classification marking applicable to a portion (e.g., designated portion) of the classified document.

Figure 1:
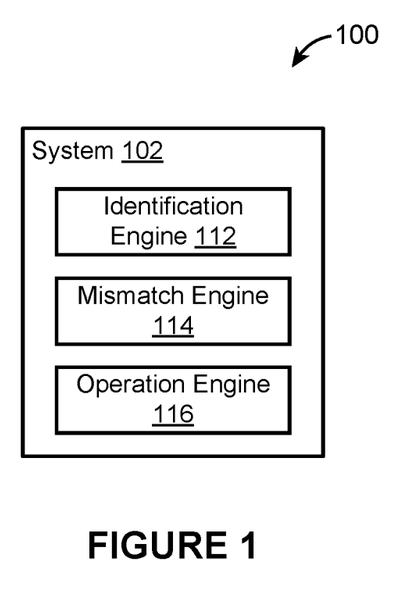
FIG. 1 illustrates an example environment for managing data spills, in accordance with various embodiments.

FIG. 1 illustrates an example environment 100 for managing data spills, in accordance with various embodiments. The example environment 100 may include a computing system 102. The computing system 102 may include one or more processors and memory. The processor(s) may be configured to perform various operations by interpreting machine-readable instructions stored in the memory. As shown in FIG. 1, in various embodiments, the computing system 102 may include an identification engine 112, a mismatch engine 114, an operation engine 116, and/or other engines.

In various embodiments, the identification engine 112 is configured to identify one or more classified documents. A classified document may be identified based on/responsive to an upload of the classified document to the computing system 102 or to a network/server/computing device monitored by the computing system 102. For example, based on an upload of a document to a network/server/computing device, the identification engine 112 may analyze the document to determine whether the document is a classified document. The identification engine 112 may determine that a document is a classified document based on classification markings (document classification markings and/or portion classification markings) associated with the document and/or other information. In general, a classified document may be uploaded by a user (e.g., a user creates/imports a classified document), uploaded by a source system (e.g., a computing system from which a classified document originates sends the classified document), or uploaded by another computing device/system (e.g., a third party computing device/system sends the classified document), for example.

In some embodiments, the identification engine 112 may be configured to identify one or more classified documents by monitoring one or more object event streams. An object event stream may describe changes occurring within a computing device and/or a network of computing devices. The changes described within the object event stream(s) may include changes relating to upload of classified documents to a computing device/network of computing devices, such as creation, reception, or importation of the classified documents.

For example, a network of computing devices may include three computing devices. In some embodiments, individual computing devices of the network may publish within individual object event streams changes occurring within those individual computing devices. Use of multiple object event streams describing changes within individual computing devices of a network of computing devices may enable early detection (e.g., detection before propagation) of changes in the network of computing devices. In some embodiments, the identification engine 112 may identify a classified document by monitoring individual object event streams of individual computing devices to detect an upload of the classified document to the network of computing devices.

In some embodiments, the changes occurring within the individual computing devices of the network may be merged together into a single object event stream (e.g., network object event stream). A single object event stream describing changes within a network of computing devices may provide a central location from which the identification engine 112 may track changes in the network of computing devices. The use of a single object event stream may enable the identification engine 112 to implement, from a single location, classified document identification logic at all edges of the nodes of a network. In some embodiments, the identification engine 112 may identify a classified document by monitoring the single object event stream to detect an upload of the classified document to the network of computing devices (e.g., to a computing device within the network).

In various embodiments, the mismatch engine 114 is configured to determine whether one or more classified documents are misclassified based on one or more mismatches between the document classification marking and one or more portion classification markings. The mismatch engine 114 may determine whether the classified document(s) are misclassified before the classified document(s) propagate through the computing system 102 or to a network/server/computing device monitored by the computing system 102. The mismatch engine 114 may determine whether the classified document(s) are misclassified when the classified document(s) enter the computing system 102 or the network/server/computing device monitored by the computing system 102.

In some embodiments, the mismatch engine 114 may determine whether a classified document is misclassified by comparing a document classification marking to one or more portion classification margins. The mismatch engine 114 may check for consistencies/inconsistencies between the document classification marking and the portion classification marking(s). For example, a classified document may be associated with a document classification marking and three portion classification markings. The mismatch engine 114 may compare the document classification marking to each of the individual portion classification markings to determine whether any of the three portion classification markings do not match the document classification marking.

In some embodiments, a match between a document classification marking and a portion classification marking may require (1) the same level/type of classification between the document classification marking and the portion classification marking, or (2) the classification of the document classification marking to be dominant over the portion classification marking. For example, classification markings may categorize information within a classified document into three security/sensitivity classifications: A, B, C. Classification A may be dominant (e.g., of higher level/type) over classifications B and C. Classification B may be dominant (e.g., of higher level/type) over classification C. Thus, classifications A, B, C may form a hierarchy of security/sensitivity classifications, where a user having clearance for classification A may view information classified as classification A, B, or C. In this example, a user having clearance for classification B may view information classified as classification B or C. Further, a user having clearance for classification C may view information classified as classification C only.

For example, a match between a document classification marking of classification A may require portion classification markings to be of classification A (same level/type), or classification B or C (document classification marking is dominant over the portion classification marking). A match between a document classification marking of classification B may require portion classification markings to be of classification B (same level/type), or classification C (document classification marking is dominant over the portion classification marking). A match between a document classification marking of classification C may require portion classification markings to be of classification C (same level/type).

In various embodiments, the mismatch engine 114 may identify classified documents associated with one or more portion classification markings that are dominant (e.g., of higher level/type) over document classification marking. For example, the mismatch engine 114 may identify a classified document with a document classification marking of classification B and one or more portion classification markings of classification A. Such a mismatch of classification markings may indicate that the overall classification of the classified document (document classification marking) is too low for the content of the classified document or one or more classifications of portions of the classified document (portion classification markings) are too high for the respective portions of the classified document.

In some embodiments, the mismatch engine 114 may require a strict correspondence between a document classification marking and the highest level of portion classification marking(s) of a classified document. The mismatch engine 114 may identify classified documents associated with a document classification marking that is dominant over all portion classification markings. For example, returning to the example of classifications A, B, and C, a classified document may be associated with a document classification marking of classification B and portion classification markings of C (or no portion classification markings). Such a mismatch of classification markings may indicate that the overall classification of the classified document (document classification marking) is too high for the content of the classified document or one or more classifications of portions of the classified document (portion classification markings) are too low for the respective portions of the classified document.

In some embodiments, a classified document may be determined to be misclassified based on a mismatch between a user classification level and one or both of the document classification marking and the portion classification marking(s). The mismatch engine 114 may identify classified documents based on mismatch between classification markings and a user's classification level. For example, returning to the example of classifications A, B, and C, a user may be authorized to create/view/share a document having classification markings of classification C (the user has classification level C). In this example, the mismatch engine 114 may identify a classified document based on the user attempting to upload the classified document associated with classification markings of classifications A and/or B. Such a mismatch of classification markings may indicate that a user is attempting to exceed the user's authorized classification level or one or more classification markings are incorrect.

In some embodiments, the mismatch engine 114 may check for inconsistencies between different uploads of the same classified document. Responsive to a first upload of a classified document, the mismatch engine 114 may parse classification markings and index the classification markings. The index of the classification markings may allow the mismatch engine 112 to determine when a subsequent upload of the same classified document is associated with different classification markings. The mismatch engine 114 may determine whether one or more classified documents are misclassified based on indexed classification markings and the classification markings of the subsequently uploaded classified document(s).

In various embodiments, the operation engine 116 is configured to, responsive to a determination that one or more classified documents are misclassified, perform one or more operations on the classified document(s). The operations on a classified document may include (1) flagging the classified document as including mismatched classifications, (2) quarantining the classified document, (3) alerting a user that the classified document requires review of the classification markings, (4) providing an interface through which a user may review the mismatched classifications, and/or other operations. A quarantined classified document may be prevented from being propagated within the computing system 102, to other computing systems/devices, within a network, to other data sources, and/or other locations. The interface may enable the user to release, delete, or reclassify the classified document. The interface may enable the user to release a classified document that was identified by the mismatch engine 114 as being misclassified because the identification was incorrect (e.g., false positive). The interface may enable the user to delete/remove the classified document from the computing system 102 and/or the network/server/computing device monitored by the computing system 102. In some embodiments, the interface may enable the user to modify the document classification marking and/or one or more portion classification markings of the classified document. Once modified, the classified document can again be analyzed by the mismatch engine 114, as described above. Other operations are contemplated.

Figure 2:
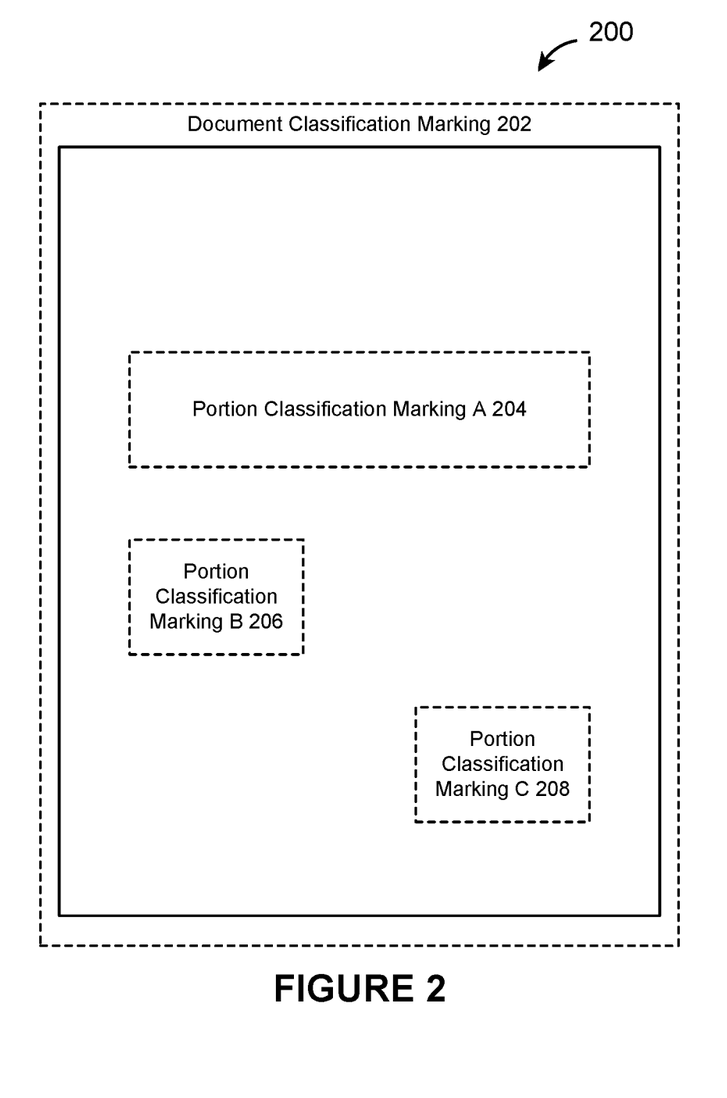
FIG. 2 illustrates example classification markings, in accordance with various embodiments.

FIG. 2 illustrates example classification markings associated with a classified document 200, in accordance with various embodiments. The classified document 200 may be associated with one or more classification markings. For example, the classified document 200 may be associated with a document classification marking 202, a portion classification marking A 204, a portion classification marking B 206, and a portion classification marking C 208. The classification markings may categorize information within the classified document 200 into different security/sensitivity classifications. Other types of classifications are contemplated.

The document classification marking 202 may classify information within the classified document 200. The portion classification markings 204, 206, 208 may classify information within corresponding portions of the classified document 200. The document classification marking 202 and the portion classification markings 204, 206, 208 may be created manually or automatically.

In some embodiments, one or more of the classification markings 202, 204, 206, 208 may be stored within the classified document 200. For example, one or more of the classification markings 202, 204, 206, 208 may be stored as text, image, watermark, metadata, and/or other information within the classified document 200. One or more of the classification markings 202, 204, 206, 208 may be embedded in a header (e.g., within classification fields located outside the main document content) of the classified document 200. In some embodiments, one or more of the classification markings 202, 204, 206, 208 may be stored separately from the classified document 200. For example, one or more of the classification markings 202, 204, 206, 208 may be stored within a file separate from the classified document 200. Other storage locations of the classification markings 202, 204, 206, 208 within/separately from the classified document 200 are contemplated.

In some embodiments, the locations of the classification markings 202, 204, 206, 208 may indicate the type of the classification markings and/or the portion of the classified document 200 to which the classification markings 202, 204, 206, 208 correspond. For example, the document classification marking 202 may be placed at the top/front/background of the classified document 200 to indicate that this is a document classification marking applicable to the entirety of the classified document 200. The portion classification markings 204, 206, 208 placed within the body of the classified document 200 may indicate that these are portion classification markings applicable to corresponding portions (e.g., designated portion as shown within dashed-lined in FIG. 2) of the classified document 200.

Based on one or more mismatches of the classification markings 202, 204, 206, 208 (e.g., mismatch between the document classification marking 202 and one or more of the portion classification markings 204, 206, 208), the classified document 200 may be flagged as including mismatched classifications and/or quarantined to prevent propagation of the classified document 200. One or more users may be alerted that the classified document 200 requires review of the classification markings. An interface may be provided through which the user(s) may review the mismatched classifications of the classified document 200. The interface may enable the user(s) to release, delete, or reclassify the classified document.

Figure 3:
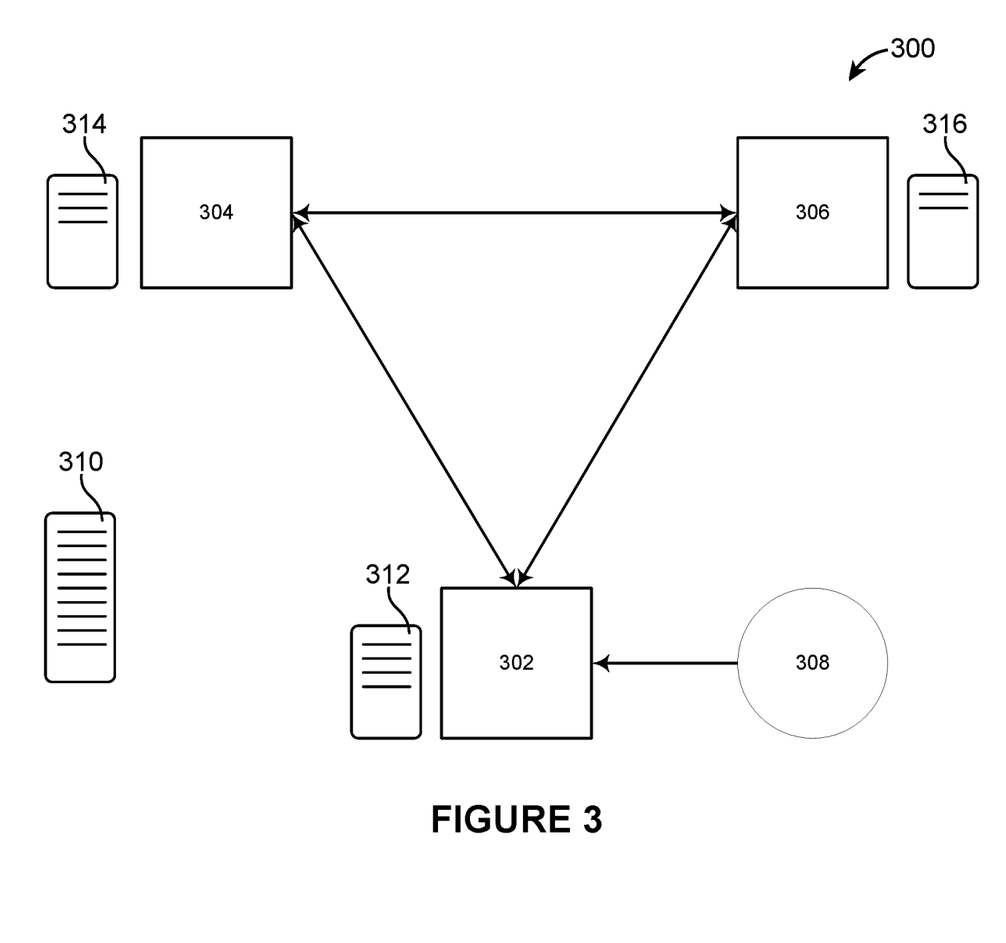
FIG. 3 illustrates an example network of computing devices, in accordance with various embodiments.

FIG. 3 illustrates an example network 300, in accordance with various embodiments. The network 300 may include computing devices 302, 304, 306. The computing devices 302, 304, 306 may form a network of data nodes that share information with one another. For example, the computing devices 302, 304, 306 may share one or more classified documents with one another. Classified documents may enter the network 300 through one or more of the computing devices 302, 304, 306. For example, a classified document may be uploaded by a user (e.g., a user imports a classified document into one of the computing devices 302, 304, 306), uploaded by a source system (e.g., a computing system from which a classified document originates) or another computing device/system (e.g., a third party computing device/system). For example, a computing device 308 may include a source system or a third party computing device/system. A classified document may be uploaded by the computing device 308 to the computing device 302, which may then propagate the classified document through the network 300.

If a classified document uploaded to the network 300 is misclassified (a misclassified document enters the network 300), the misclassified document may propagate through the network 300, resulting in misuse of the information contained within the misclassified document, misclassification of other information, and/or misuse of other information. To prevent propagation of misclassified documents, classified documents uploaded to the network 300 (through computing devices 302, 304, 306) may be identified. The classified documents may be analyzed to determine whether the classified documents are misclassified based on one or more mismatches of classification markings (document and portion classification markings) and/or other information.

In some embodiments, the upload of classified documents may be identified based on monitoring of one or more object event streams 310, 312, 314, 316. The object event streams 312, 314, 316 may describe changes occurring within respective computing devices 302, 304, 306. The object event stream 310 may describe changes occurring within the network 300. For example, the computing devices 302, 304, 306 may publish changes occurring within itself in object event streams 312, 314, 316, respectively. In some embodiments, the changes occurring within the computing devices 302, 304, 306 may be merged together into a single object event stream (e.g., the object event stream 310). The changes described within the object event streams 310, 312, 314, 316 may include changes relating to upload of classified documents to the computing devices 302, 304, 306, the network 300, such as creation, reception, or importation of the classified documents.

The use of the object event streams 312, 314, 316 (describing changes within the computing devices 302, 304, 306, respectively, of the network 300) may enable early detection (e.g., detection before propagation) of changes in the network 300. Classified documents may be identified by monitoring the object event streams 302, 304, 306 to detect an upload of classified documents to the computing devices 302, 304, 306, the network 300.

The object event stream 310 (describing changes within the network 300) may provide a central location from which to track changes in the network 300. The use of the object event stream 310 may allow implementation, from a single location, of classified document identification logic at all edges of the nodes of the network 300. Classified documents may be identified by monitoring the object event stream 310 to detect an upload of classified documents to the computing devices 302, 304, 306, the network 300.

Classified documents may be determined to be misclassified based on mismatches of classification markings associated with the classified documents. A misclassified document may be flagged as including mismatched classifications and/or quarantined to prevent propagation of the misclassified document within the computing devices 302, 304, 306 and/or the network 300. One or more users (e.g., of the computing devices 302, 304, 306 and/or the network 300) may be alerted that the misclassified document requires review of its classification markings. An interface may be provided through which the user(s) may review the mismatched documents/classifications. The interface may enable the user(s) to release, delete, or reclassify the misclassified document.

Figure 4:
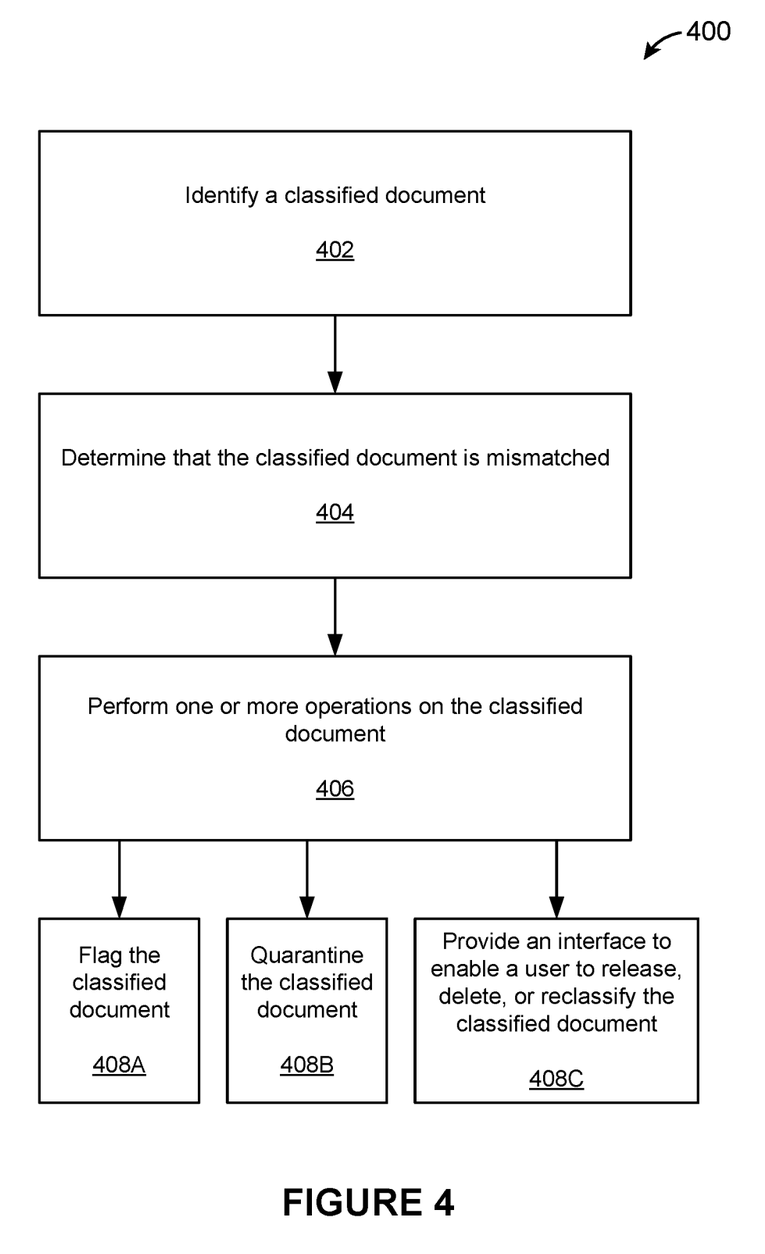
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a classified document may be identified. At block 404, the classified document may be determined to be mismatched. At block 406, one or more operations may be performed on the classified document. At block 408A, the classified document may be flagged as including mismatched classifications. At block 408B, the classified document may be quarantined to prevent the classified document from being propagated to other data sources. At block 408C, an interface may be provided to enable a user to release, delete, or reclassify the classified document.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
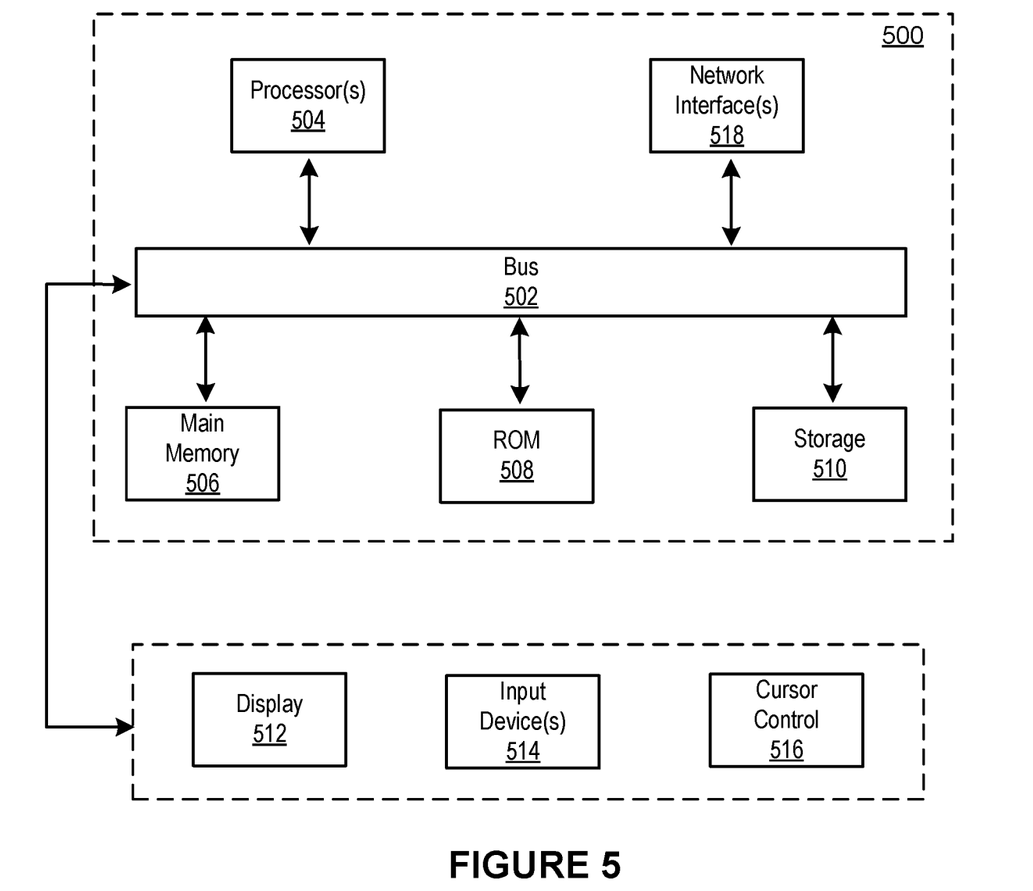
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
memory storing instructions that, when executed by the one or more processors, cause the system to perform:
identifying a classified document at least in part by monitoring an object event stream that describes changes in a network of computing nodes, the object event stream enabling implementation, from a central location, of classified document identification logic at each node at an edge of the network, the classified document being associated with a document classification marking and one or more portion classification markings, the document classification marking indicating an overall level of classification assigned to the classified document, and each of the one or more portion classification markings indicating a respective classification level assigned to a corresponding portion of the classified document, the document classification marking being distinct from the one or more portion classification markings;
determining a mismatch between the document classification marking and a first portion classification marking of the one or more portion classification markings, wherein the first portion classification marking indicates a first classification level assigned to a first portion of the classified document, and wherein determining the mismatch comprises:
identifying matching criteria requiring that the document classification marking be at a same level as or dominant over each of the one or more portion classification markings; and
determining that the first classification level is dominant over the overall level of classification of the classified document; and
determining that the matching criteria are not satisfied based at least in part on determining that the first classification level is dominant over the overall level of classification of the classified document,
the mismatch indicating that the first classification level exceeds a classification level that matches content of the first portion;
determining the classified document as misclassified based at least in part on the determined mismatch; and
in response to determining the classified document as misclassified, performing one or more operations on the classified document.

2. The system of claim 1, wherein the one or more operations include flagging the classified document as including mismatched classifications and providing an interface through which a user may review the mismatched classifications.

3. The system of claim 2, wherein the interface enables the user to release, delete, or reclassify the classified document.

4. The system of claim 1, wherein the one or more operations include quarantining the classified document, wherein the quarantined classified document is prevented from being propagated to other data sources.

5. The system of claim 1, wherein one or both of the document classification marking and the one or more portion classification markings are embedded in a header of the classified document.

6. The system of claim 1, wherein monitoring the object event stream comprises monitoring the object event stream to detect an upload of the classified document.

7. The system of claim 1, wherein the instructions further cause the system to perform determining that the classified document is misclassified based on a mismatch between a user classification level and one or both of the document classification marking and the one or more portion classification markings.

8. The system of claim 1, wherein a location of a particular marking within the classified document is indicative of whether the particular marking is the document classification marking or one of the one or more portion classification markings.

9. The system of claim 1, wherein identifying the classified document includes monitoring a plurality of event object streams, wherein each of the plurality of event object streams is published by and describes changes to a respective corresponding computing device of a network of computing devices.

10. The system of claim 1, wherein the mismatch is a first mismatch, the matching criteria is first matching criteria, and the one or more portion classification markings is a plurality of portion classification markings, and wherein the instructions, when executed by the one or more processors, further cause the system to perform:

determining a second mismatch between the document classification marking and a second portion classification marking of the plurality of portion classification markings, wherein the second portion classification marking is associated with a second classification level assigned to a second portion of the classified document, the second classification level being highest among respective classification levels assigned to the plurality of portion classification markings, and wherein determining the second mismatch comprises:

identifying second matching criteria requiring a strict correspondence between the document classification marking and each of the one or more portion classification markings;

determining that the overall level of classification of the classified document is dominant over the second classification level; and         determining the second mismatch based at least in part on determining that the overall level of classification of the classified document is dominant over the second classification level,     the second mismatch indicating that the overall level of classification exceeds a level of classification that matches content of the classified document or that the second classification level is below a classification level that matches content of the second portion of the classified document,     wherein determining the classified document as misclassified comprises determining the classified document as misclassified further based at least in part on the determined second mismatch.

11. A method implemented by a computing system including one or more processors and storage media storing machine-readable instructions, wherein the method is performed using the one or more processors, the method comprising:

identifying a classified document at least in part by monitoring an object event stream that describes changes in a network of computing nodes, the object event stream enabling implementation, from a central location, of classified document identification logic at each node at an edge of the network, the classified document being associated with a document classification marking and one or more portion classification markings, the document classification marking indicating an overall level of classification assigned to the classified document, and each of the one or more portion classification markings indicating a respective classification level assigned to a corresponding portion of the classified document, the document classification marking being distinct from the one or more portion classification markings;

determining a mismatch between the document classification marking and a first portion classification marking of the one or more portion classification markings, wherein the first portion classification marking indicates a first classification level assigned to a first portion of the classified document, and wherein determining the mismatch comprises:

identifying matching criteria requiring that the document classification marking be at a same level as or dominant over each of the one or more portion classification markings; and         determining that the first classification level is dominant over the overall level of classification of the classified document; and         determining that the matching criteria are not satisfied based at least in part on determining that the first classification level is dominant over the overall level of classification of the classified document,     the mismatch indicating that the first classification level exceeds a classification level that matches content of the first portion of the classified document;

determining the classified document as misclassified based at least in part on the determined mismatch; and     in response to determining the classified document as misclassified, performing one or more operations on the classified document.

12. The method of claim 11, wherein the one or more operations include flagging the classified document as including mismatched classifications and providing an interface through which a user may review the mismatched classifications.

13. The method of claim 12, wherein the interface enables the user to release, delete, or reclassify the classified document.

14. The method of claim 11, wherein the one or more operations include quarantining the classified document, wherein the quarantined classified document is prevented from being propagated to other data sources.

15. The method of claim 11, wherein one or both of the document classification marking and the one or more portion classification markings are embedded in a header of the classified document.

16. The method of claim 11, wherein monitoring the object event stream comprises monitoring the object event stream to detect an upload of the classified document.

17. The method of claim 11, further comprising determining that the classified document is misclassified based on a mismatch between a user classification level and one or both of the document classification marking and the one or more portion classification markings.

18. A non-transitory computer readable medium comprising instructions that, when executed, cause one or more processors to perform:

identifying a classified document at least in part by monitoring an object event stream that describes changes in a network of computing nodes, the object event stream enabling implementation, from a central location, of classified document identification logic at each node at an edge of the network, the classified document being associated with a document classification marking and one or more portion classification markings, the document classification marking indicating an overall level of classification assigned to the classified document, and each of the one or more portion classification markings indicating a respective classification level assigned to a corresponding portion of the classified document, the document classification marking being distinct from the one or more portion classification markings;

determining a mismatch between the document classification marking and a first portion classification marking of the one or more portion classification markings, wherein the first portion classification marking indicates a first classification level assigned to a first portion of the classified document, and wherein determining the mismatch comprises:

identifying matching criteria requiring that the document classification marking be at a same level as or dominant over each of the one or more portion classification markings; and determining that the first classification level is dominant over the overall level of classification of the classified document; and determining that the matching criteria are not satisfied based at least in part on determining that the first classification level is dominant over the overall level of classification of the classified document, the mismatch indicating that the first classification level exceeds a classification level that matches content of the first portion of the classified document;

determining the classified document as misclassified based at least in part on the determined mismatch; and in response to determining the classified document as misclassified, performing one or more operations on the classified document.

19. The non-transitory computer readable medium of claim 18, wherein the one or more operations include quarantining the classified document, wherein the quarantined classified document is prevented from being propagated to other data sources.

20. The non-transitory computer readable medium of claim 18, wherein the mismatch is a first mismatch, the matching criteria is first matching criteria, and the one or more portion classification markings is a plurality of portion classification markings, and wherein the instructions, when executed, further cause the one or more processors to perform:

determining a second mismatch between the document classification marking and a second portion classification marking of the plurality of portion classification markings, wherein the second portion classification marking is associated with a second classification level assigned to a second portion of the classified document, the second classification level being highest among respective classification levels assigned to the plurality of portion classification markings, and wherein determining the second mismatch comprises:

identifying second matching criteria requiring a strict correspondence between the document classification marking and each of the one or more portion classification markings;

determining that the overall level of classification of the classified document is dominant over the second classification level; and determining the second mismatch based at least in part on determining that the overall level of classification of the classified document is dominant over the second classification level, the second mismatch indicating that the overall level of classification exceeds a level of classification that matches content of the classified document or that the second classification level is below a classification level that matches content of the second portion of the classified document, wherein determining the classified document as misclassified comprises determining the classified document as misclassified further based at least in part on the determined second mismatch.

* * * * *